United States Patent
Jiang

(10) Patent No.: US 9,075,420 B2
(45) Date of Patent: Jul. 7, 2015

(54) TEMPERATURE MONITORING OF POWER SWITCHES

(75) Inventor: Jinseng Jiang, Nuremberg (DE)

(73) Assignee: Baumuller Nurnberg GmbH, Nuremburg (DE)

( * ) Notice: Subject to any disclaimer, the term of this patent is extended or adjusted under 35 U.S.C. 154(b) by 1191 days.

(21) Appl. No.: 12/530,485

(22) PCT Filed: Mar. 20, 2008
(Under 37 CFR 1.47)

(86) PCT No.: PCT/EP2008/053360
§ 371 (c)(1),
(2), (4) Date: Jan. 12, 2011

(87) PCT Pub. No.: WO2008/113849
PCT Pub. Date: Sep. 25, 2008

(65) Prior Publication Data
US 2011/0157944 A1    Jun. 30, 2011

(30) Foreign Application Priority Data

Mar. 22, 2007 (EP) .................................... 07104679

(51) Int. Cl.
 *G05D 23/19* (2006.01)
 *H02M 7/5387* (2007.01)
 *H02M 7/00* (2006.01)

(52) U.S. Cl.
 CPC ........... *G05D 23/1935* (2013.01); *H02M 7/003* (2013.01); *H02M 7/53871* (2013.01); *H02M 7/5387* (2013.01)

(58) Field of Classification Search
 CPC   H02M 7/53871; H02M 7/5387; H02M 7/003
 USPC ........ 363/95, 97, 98, 131–134, 141; 341/119; 323/907; 327/262, 371, 378, 513
 See application file for complete search history.

(56) References Cited

U.S. PATENT DOCUMENTS 4,001,649 A     1/1977   Young
6,268,986 B1 *  7/2001   Kobayashi et al. ............. 361/24
(Continued)

FOREIGN PATENT DOCUMENTS

CN     1512657 A     7/2004
CN     1698258 A     11/2005
(Continued)

*Primary Examiner* — Jessica Han
*Assistant Examiner* — Gustavo Rosario Benitez
(74) *Attorney, Agent, or Firm* — Frank H. Foster; Kremblas & Foster

(57) ABSTRACT

A method for monitoring the temperatures of at least two semi-conductor power switches that are arranged on a common cooling body. Temperature detection is carried out by means of a temperature model each allocated to a switch, in which switch and operating parameters as well as temperature measurement values are processed for calculating the temperature and/or a temperature difference in the relevant switch. A temperature measurement value from a temperature sensor is used as an input parameter for the temperature model, the temperature sensor being centrally positioned between at least two switches and standing in a heat conducting connection with the cooling body. A related apparatus is an electronic temperature emitting power switch arrangement, having a temperature sensor positioned centrally between the two or between two switches each, the same being coupled in a heat conducting way with the cooling body and with the output side of the calculator.

13 Claims, 2 Drawing Sheets

(56) References Cited

U.S. PATENT DOCUMENTS

| | | | |
|---|---|---|---|
| 2002/0038795 A1* | 4/2002 | Katooka et al. | 219/130.21 |
| 2003/0001605 A1 | 1/2003 | Jones et al. | |
| 2003/0072117 A1* | 4/2003 | Maekawa et al. | 361/86 |
| 2003/0076233 A1* | 4/2003 | Sato et al. | 340/679 |
| 2003/0169611 A1* | 9/2003 | Nishizawa et al. | 363/132 |
| 2006/0013025 A1* | 1/2006 | Poyhonen et al. | 363/55 |
| 2007/0097770 A1* | 5/2007 | Ronkainen et al. | 365/211 |

FOREIGN PATENT DOCUMENTS

| | | |
|---|---|---|
| DE | 3536098 A1 | 9/1987 |
| DE | 19860762 A1 | 6/2000 |
| EP | 1193756 A1 | 4/2002 |
| TW | 086110614 | 6/1998 |
| TW | 092135953 | 11/2004 |
| TW | 096108402 | 1/2008 |

* cited by examiner

TEMPERATURE MONITORING OF POWER SWITCHES

BACKGROUND OF THE INVENTION

The invention concerns a method for detecting and/or monitoring the temperatures of at least two electronic power switches manufactured in particular from a semi-conductor material. In addition the two switching modules are coupled with, e.g. positioned on a common cooling body. The temperature detection and/or monitoring is carried out by means of a temperature model, each of which is associated with one of the switches or switching modules. In the temperature model associated with one of the switches switching and operating parameters are processed in order to calculate the temperature and/or a temperature difference within the relevant switches.

The invention further concerns a temperature emitting electronic power switch assembly that can in particular consists of a converter for electric drives or another power converter. This arrangement is suitable for carrying out the said method and is equipped with two or more switches, in particular power semi-conductor switches, which are coupled with, e.g. positioned on a common cooling body. A calculator calculates a temperature model for each of the switches and records signals representing switching and operating parameters as well as temperature measurements via interfaces. In this way the temperature and/or a temperature difference is calculated in the relevant switch by means of the temperature model activated within the calculator.

A method and an arrangement for a converter with power semi-conductors of the type described above is known from EP 1 193 756 A1. A temperature model that calculates at least the temperature surrounding the cooling body and/or the air supply to the cooling body, an operating parameter and a unit parameter is used here, and temperature differences and/or temperatures are calculated. In the cooling chain of the converter two temperatures are measured in different positions and it is attempted to calculate the temperatures of the same by means of the temperature model in connection with the loss of the power switch. For this it is suggested that two temperature sensors are positioned differently in such a way that the first position provides a substantially lower heat conducting resistance to the switches than the second temperature measuring position. In fact the temperature sensor in the first position measures the temperature of the power semi-conductor switch, and the temperature sensor in the second position measures the temperature of the air supply that is taken in by a fan and directed onto the cooling body to extract heat. One disadvantage of this is however the fact that the temperature distribution within the cooling medium, namely in the fan air supply and also in the cooling body is assumed to be distributed in a homogenous way and that it is further assumed that all semi-conductor power switches of the converter would be at the same temperature and be subject to identical temperature changes.

A method for protecting end sections against over temperatures is known from DE 198 60 762 A1, whereby the end sections are a part of a controller for a combustion engine. The losses of the power switch of the end section, and therefore the temperature of the same, are assumed proportionally as the switch-on time. The temperature is detected by means of a temperature model that takes into consideration at least the internal losses of the controller components. From the control times the actual losses of the individual end sections are calculated.

A means for monitoring the temperature of a thyristor is known from DE 35 36 098 A1, the same being cooled by means of cooling bodies and ambient air. In order not to exceed the maximum temperature on the thyristor semi-conductor the temperature of the ambient air and the losses of the thyristor are recorded. With the aid of a thermic model known as "power semi-conductor, cooling body, cooling medium to ambient air" the temperature at the thyristor is determined.

Chapter 3.2 starting with page 135 of the application handbook 2005/12 of the company SEMIKRON describes the thermic characteristics of semi-conductor switching modules, in particular of IGBT modules. The calculation of the losses of transistor and free diode of an IGBT in particular is described therein and the adherence to a maximum permitted bather layer temperature of 150° C. prescribed. In addition page 145 shows a detailed thermic replacement flow diagram for the calculation of the bather layer temperature. However, this company information does not show how temperature recording and monitoring can be carried out efficiently for an arrangement with a multitude of semi-conductor power switching modules which are commonly used in converters.

It is therefore the purpose of the invention to increase the reliability and accuracy of temperature recordings for all switches for the temperature monitoring of an arrangement with several electronic power switches with the least possible additional effort for all switches.

BRIEF SUMMARY OF THE INVENTION

This task is solved in accordance with the invention by the temperature recording and/or monitoring method described in Claim 1 as well as the temperature emitting electronic power switching arrangement described in Claim 10. Further preferred embodiments of the invention result from the dependent Claims.

The general teaching of the invention is characterised in that the temperature sensors for the monitoring of the power switch are designed and used in such a way that several or preferably all power switches are systematically incorporated into the temperature recording and evaluation. When each power switch is effectively connected in a thermic way with at least one temperature sensor in the context of the invention the temperatures of all power switches can in principle be taken into consideration by means of the signal outputs of the temperature sensors for the purpose of temperature monitoring.

With this general teaching of the invention the problem that in practice the temperature distribution within the cooling medium, e.g. the cooling media is not homogenous can be solved. In fact the temperature differences between the inlet and outlet air streams are higher in particular under greater load of the power switch, or even very large in the converter formed with the same, as the correspondingly high losses must be exported via the cooling medium. In addition the cooling body also shows large temperature differences in various locations and in various areas. This is the case in particular when converters designed for high capacities have large mechanical dimensions and expansions, or when the output frequency or the basic motor vibration frequency is approximately zero. With an output frequency or a basic motor vibration frequency of zero the losses of different power switches are extremely different.

With the method of prior art as described above it is not possible to accurately calculate the temperature of each individual power switch with the aid of a temperature model and to protect the power switch against temperature, as a homogeneity of the temperature distribution that does not exist in practice is always assumed. Contrary to this it is possible with the invention to realise the advantage of an improved use of the power switch thanks to the precise thermic monitoring of the same, e.g. with a much lower power reserve. it is possible with the invention to very accurately detect the temperatures of a number of power switches, for example those of a converter with very large mechanical dimensions and/or for an operation at a very small output frequency or basic motor vibration frequency with a minimum of extra effort by way of temperature sensors, on the basis of which the thermic capacity is used more effectively.

According to an optional preferred embodiment of the invention two switches that are controlled in a synchronous fashion and/or positioned in series act together in such a way that an alternating current or a phase of a multi-phase alternating current, in particular a three-phase current can be measured at a second nodal point located between the same. In particular in the case of a three-phase current system that is created in the known way with a power switch arrangement supplied with direct current, in particular for a converter, a preferred embodiment of the invention is realised in that the switches of each alternating or three-phase power phase are allocated at least one common temperature sensor. This can then supply temperature information to a calculator for calculating the temperature model by means of the opposite switches between which the relevant temperature sensor is located.

Suitable input parameters for the temperature model(s) allocated to the switch or switches are operating parameters such as an electric current flowing through the switches, an electric current applied to the one or more switches, in particular the direct current of an interim circuit of converters and/or the frequency or intervals of the switching controller. In addition unit specific parameters such as thermic resistors or capacitors in the relevant switch interior or the cooling body can be incorporated into the relevant temperature model. With this temperature model the thermic time constant that acts on the temperature transmission between the cooling body and the power switch module floor can then be deducted on the one hand, and the temperature of the module floor, e.g. the housing or floor of the power switch calculated on the other. In addition and based on the cooling body and the housing temperatures the timed development of the bather layer temperature, for example of a transistor and a diode of a conventional power switch module, can be calculated by means of temperature models that are known in themselves (see SEMIKRON company documentation mentioned above, in particular page 146 of the same) in order to control the adherence to a maximum permitted bather layer temperature. In addition the SEMIKRON company documentation mentioned above describes methods for detecting the losses, for example of the transistor and the diode of a power switch module.

When using the power switch temperature monitor for operating electric three-phase motors one can encounter the problem that the motor does not only move, e.g. is penetrated by an electric three-phase field, but can also stand still. In the first case, namely with output or basic motor vibration frequencies of more than approximately five Hertz it will suffice to assume an average current value, namely a median value for the losses of the relevant power switch, and to use this median value for the temperature model. In the second case, e.g. with output or basic motor vibration frequencies of less than approximately five Hertz it is preferred to use formulas and methods (see the SEMIKRON company documentation mentioned above) for calculating the momentary value of the relevant switch loss.

The electric power and temperature emitting switch arrangement of the invention is characterised by the allocation of a temperature sensor to at least two power switches each, whereby only approximately half the number of temperature sensors are required for the recording and monitoring of the power switch temperatures compared with the number of power switches thanks to the central temperature sensor arrangement between the same. In this way three temperature sensors will suffice for conventional three-phase motors with six power switches, which are preferably positioned centrally between two switches of a three-phase power phase.

In addition the relevant number of temperature sensors can be preferably evenly distributed across the surface of the cooling body in the case of more than two power switches according to a further preferred embodiment of the invention. Alternatively or in addition it is useful to position the number of temperature sensors along a preferably central symmetrical line of the cooling body. In a case of for example six power switches for producing a three-phase current network the three relevant temperature sensors can be located centrally between two power switches, whereby the symmetrical line will then for example represent a central longitudinal axis of the cooling body.

BRIEF DESCRIPTION OF THE SEVERAL VIEWS OF THE DRAWING

Further details, characteristics, characteristics combinations, effects and advantages based on the invention result from the following description of a preferred embodiment of the invention and the enclosed drawings, whereby.

DETAILED DESCRIPTION OF THE INVENTION

Figure 1:
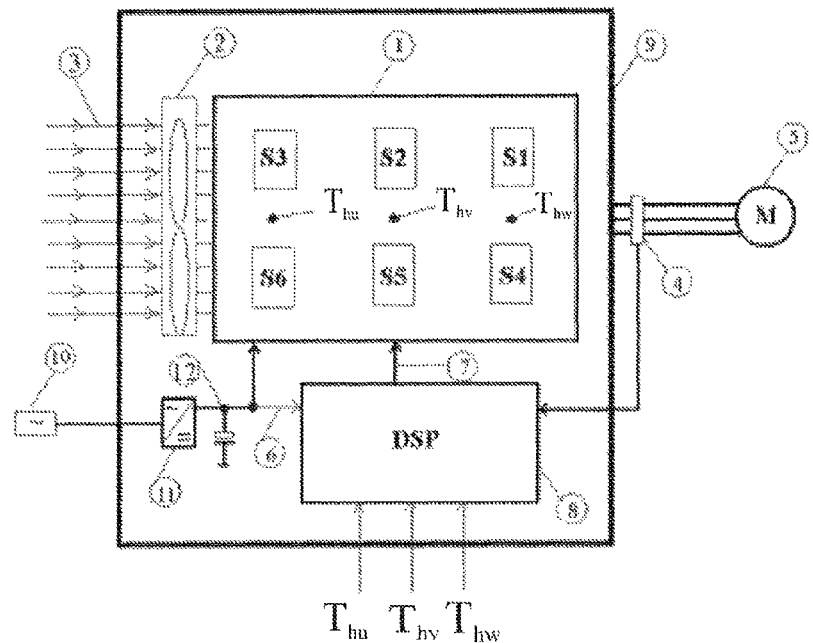
FIG. 1 shows a unit technical block diagram of a power section with a converter and air cooling as well as a digital signal processor for temperature monitoring.
Figure 2:
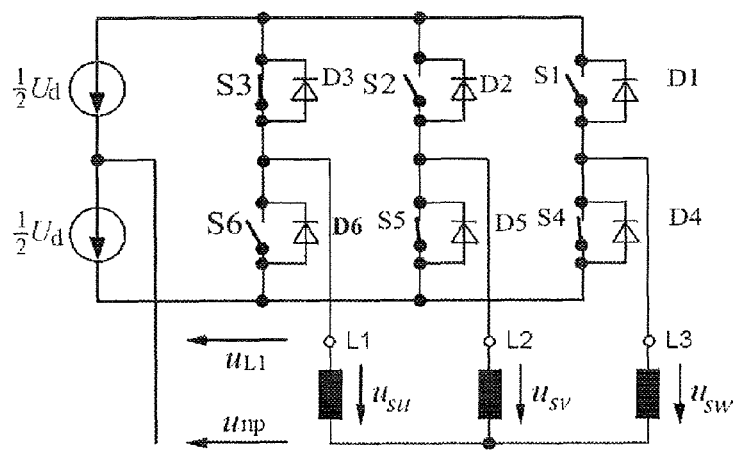
FIG. 2 shows a principle flow diagram of the converter switching configuration for producing a three-phase current system for an electric drive.

According to FIG. 1 six power semi-conductor switches S1-S6 are fitted directly onto a somewhat oblong rectangular cooling body. They are arranged in two parallel rows S1-S3, e.g. S4-S6 extending side by side, which each extend along one half of the cooling body and in a longitudinal direction of the same. In FIG. 2 the detailed assembly of the switches S1-S6 is shown as it is generally known to the expert world (see for example the SEMIKRON company information mentioned above; pages 68, 69 and 139). It is clear in particular that each power switch S1, ... S6 has been allocated a free, e.g. return diode D1, ... D6. Between two power switches S1, S4; S2, S5; S3, S6 switched in series and each generating a phase U, V, W of the three-phase current system a sinusoidal alternating current is measured and for example supplied to the coils L1, L2, L3 of the rack of a three-phase motor.

According to FIG. 1 a current measurement 4 is carried out at the three phase strands of the three-phase motor 5. The cooling body 1 is supplied with air for reducing heat via a fan 2. The signal outputs of the current measurement 4 are supplied to a calculator 8, for example a digital signal processor (DSP), which is used for processing and evaluating sensor input signals and for monitoring temperatures with the aid of a temperature model programmed into and implemented for the same amongst other things. In addition the calculator 7 is for example connected with means for measuring an interim circuit voltage 12 for further evaluation via an analogue/digital transducer. A rectifier 11 supplied by the network voltage 10 serves for the generation of the interim circuit voltage. The direct current 12 derived from the network voltage 10 by means of the rectifier 11 is, as is generally known, transformed via the converter 9 into a three-phase system for supplying the three-phase motor 5. The power switches S1-S6 are controlled, e.g. activated by the calculator 8 by means of control signals 7 with the aid of the pulse width modulation method (PWM) in order to generate suitable voltages Uu, Uv, Uw in line with the three phases of the three-phase system at the rack coils L1, L2, L3 and for generating sinusoidal alternating currents. For converters with a higher capacity, discrete power switches, whose mechanical dimensions are rather large due to their nature, must be used.

In these power switches S1-S6 losses occur during operation, which will depend on various operating parameters and the unit technical parameters of the power switches. The operating parameters can for example be the electric current that flows through the power switch and can be recorded by means of the current measurement 4, the interim circuit voltage 12 that can be recorded by means of the voltage measurement 6, the switching frequency of the power switches and the operating type or the basic vibration frequency of the three-phase motor 5. The parameters of the power switches are normally known to the manufacturers of the power switches. The power switch losses are transferred to the cooling body 1 and the ambient air 3 extracts the losses to atmosphere in the way of a cooling medium. In the calculator methods including thermic replacement flow diagrams for the power switches can be implemented in order to be able to calculate the losses and/or the bather layer temperatures of the switches, whereby a realisation with power semi-conductors is assumed in the latter case.

Figure 3:
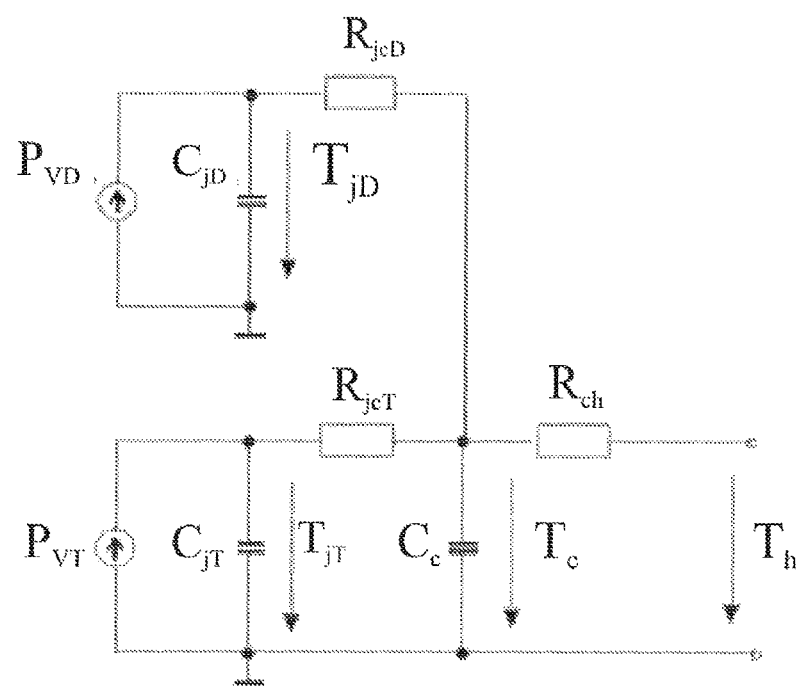
FIG. 3 shows a simplified thermic replacement flow diagram of a switching module realised with power semi-conductors.

The temperatures of the power switches S1-S6 are in turn dependent on the losses and the various thermic parameters of the overall power section that in turn depend on the mechanical construction. These unit parameters are the thermic resistors and the thermic capacitors of the power switches S1-S6 and the cooling body 1. The thermic resistors and the thermic capacitors of the power switches are known to the semiconductor manufacturers (see SEMIKRON company information mentioned above) and those of the cooling body 1 can be determined by measuring the various power sections. In order to monitor the permitted maximum bather layer temperature of the power switches a temperature model associated with each of the same is used, which serves for calculating the bather layer temperature (see SEMIKRON company information and others). The abbreviations listed in the thermic replacement flow diagram of FIG. 3 are as follows:

PVD: the losses of the return diode
RjcD: thermic transition resistance of the diode between chip and module floor
CjD: thermic capacity of the diode chip
PVT: the losses of the transistor
RjcT: thermic transition resistance of the transistor between chip and module floor
CjT: thermic capacity of the transistor
Rch: thermic transition resistance between module floor and cooling body
Cc: thermic capacity of the module floor
TjD: temperature of the diode bather layer
TjT: temperature of the transistor bather layer
Tc: temperature of the module floor
Th: temperature of the cooling body, Thu for example for phase U During the operation with a three-phase current the current flowing through the relevant power switch S1-S6 is sinusoidal and the amplitude of the same periodically changes between zero and the maximum value. The losses in the power switch therefore also change periodically. With an output frequency for the converter 9 of more than five Hertz the median value of the losses due to effects of the thermic time constant can be used for the approximate calculation of the temperature of the power semi-conductor barrier layer. With a low output frequency of for example up to five Hertz the momentary, e.g. moment value of the losses should be used. For the calculation of the losses we refer to the SEMIKRON company information described above.

According to FIG. 1 a measurement is carried out for each of the three phases U, V, W by means if temperature sensors Thu, Thv, Thw. The measuring positions are chosen in such a way that the temperature of the bather layer of a power switch, for example S1 (or S4) for phase W is almost independent from the losses of the power switches allocated to the other phases U, V, for example S2 or S5 of the phase V, and can be calculated in the calculator 8. At the same time the losses of a power switch with certain alternating current phases, for example Si with the phase W, are almost independent from the losses of the second switch S4 also allocated to this phase W. For all switches S1-S6 the relevant bather layer temperatures can be calculated with the aid of the output signals of the temperature sensors Thu, Thv, Thw.

According to FIG. 1 the measuring positions of the said temperature sensors are chosen in such a way that even a non-homogeneous temperature distribution will not negatively affect the cooling body and/or the temperature monitoring of the individual power switches between the power switches S1-S6. For this the temperature sensors Thu, Thv, Thw are each positioned exactly in the middle between the switches S1, S4; S2, S5; S3, S6 allocated to two of the three individual phases U, V, W. From this the arrangement of the temperature sensors in a common row between the two rows of power switches S1-S3, e.g. S4-S6 results in the longitudinal direction of the cooling body 1. According to FIG. 1 an arrangement of the three temperature sensors Thu, Thv, Thw, each between the power switch pairs of the two switches of one of the three phases along a symmetrical line, in particular the central longitudinal axis of the cooling body 1.

The thermic time constant $\tau ch = Rch*Cc$ representing the thermic transition between the module floor and the power switch and cooling body 1 and the temperature model for forming the input side for calculating the temperature sensor measurement value is detected in real life for each type of power section with the aid of a test.

When the calculated barrier layer temperature or the temperature difference between the barrier layer and the module floor of a power switch exceeds a certain limit value at least one safety action is triggered. Examples for such safety actions are:

Acoustic and/or optical signals
Power reduction
Reduction of switching frequency or of the basic motor vibration frequency
Blocking of the converter It is also possible to install several limits, e.g. limit values in order to trigger various different actions.

LIST OF REFERENCE NUMBERS

1 Cooling body
2 Fan
3 Air supply
4 Current measurement
5 Motor
6 Measurement of interim circuit voltage (ZKS)
7 Control signals
8 DSP for monitoring and evaluation
9 Transformer
10 Network voltage
11 Rectifier
12 Interim circuit voltage (ZKS)
S1, S4 Semi-conductor power switch of phase W
S2, S5 Semi-conductor power switch of phase V
S3, S6 Semi-conductor power switch of phase U
D1, D4 Return, e.g. free diode of phase W
D2, D5 Return, e.g. free diode of phase V
D3, D6 Return, e.g. free diode of phase U
Thu Temperature sensor of phase U
Thv Temperature sensor of phase V
Thw Temperature sensor of phase W

The invention claimed is:

1. A method for detecting or monitoring the temperatures of a group of multiple electronic power switches that are coupled with a common cooling body (1), wherein the temperature detection or monitoring is carried out by means of a temperature model allocated to each of the power switches, the temperature model processing switching and operating parameters as well as temperature measurement values for calculating the temperature or a temperature difference in the electronic power switches, characterised by
   (a) the group of multiple electronic power switches including at least one subgroup of the electronic power switches, each subgroup including at least two of the electronic power switches and one temperature sensor allocated to the power switches of the subgroup, said temperature sensor being centrally positioned in the middle between the electronic power switches of the subgroup to which the temperature sensor is allocated and being in a heat transmitting connection with the cooling body (1); and
   (b) using a temperature measurement value from said centrally positioned temperature sensor (Thu, Thv, Thw) as an input parameter to the temperature model of each of the electronic power switches of the subgroup, wherein the number of temperature sensors does not exceed half the number of power switches in the group; and
   (c) wherein an electric current flowing through the electronic power switches (S1-S6), an electric voltage applied to one or more electronic power switches (S1-S6), a switching frequency or interval of the electronic power switches or thermic resistances or capacities of the electronic power switches (S1-S6) or the cooling body (1) are used as an input parameter for the temperature model(s); and
   (d) the method using semiconductor electronic power switches wherein values for losses of one or more electronic power switches are processed by means of the temperature model.

2. A method according to claim 1, characterised in that the at least two electronic power switches (S1-S6) are coordinated in pairs or timed in relation to each other for generating an alternating current or a phase (U, V, W) of a two-, three- or multi-phase alternating current system from a direct current.

3. A method according to claim 2, whereby more than two electronic power switches (S1-S6) are used for generating a two-, three- or multi-phase alternating or three-phase system (Usu, Usv, Usw), which are each coupled with the common cooling body (1), characterised in that one temperature measurement value from the temperature sensor (Thu, Thv, Thw) is used per electronic power switch (S1-S6) as an input parameter for the temperature model, which said temperature sensor is positioned centrally on the cooling body (1) between two adjacently located or adjacently arranged electronic power switches (S1-S6).

4. A method according to claim 3, characterised in that the electronic power switches (S1, S4; S2, S5; S3, S6) of each alternating or three-phase current phase (U, V, W) are allocated at least one common temperature sensor (Thu, Thv, Thw).

5. A method according to claim 1 using semi-conductor electronic power switches, characterised in that one or more barrier layer temperatures or at least one temperature difference between a barrier layer temperature and a housing or floor temperature of at least one of the semi-conductor electronic power switches is calculated by means of the temperature model for each of the semi-conductor electronic power switches, and safety measures are triggered by the calculated temperatures or temperatures differences when a certain temperature threshold is exceeded.

6. A method according to claim 5, characterised in that an average value of a power loss is used for calculating one or more barrier layer temperatures for an output or basic vibration frequency of more than 5 Hz.

7. A method according to claim 5, characterised in that an instantaneous value is used for losses for calculating one or more barrier layer temperatures for an output or basic vibration frequency of up to 5 Hz.

8. A power electronic temperature sensing switch arrangement including a power converter (9) for electric drives or power rectifiers with a group of two or more semi-conductor electronic power switches coupled with or arranged on a common cooling body (1), and with a calculator (8) suitable for implementing and executing a temperature model for each of the electronic power switches (S1-S6), the electronic temperature emitting power switch arrangement also including interfaces for receiving signals representing switching and operating parameters as well as temperature measurement values in order to calculate the temperature or a temperature difference within electronic power switches (S1-S6) by means of the temperature model, wherein an electric current flowing through the electronic power switches (S1 - S6), an electric voltage applied to one or more electronic power switches (S1 - S6), a switching frequency or interval of the electronic power switches or thermic resistances or capacities of the electronic power switches (S1-S6) or the cooling body (1) are used as an input parameter for the temperature model(s) and the power switch arrangement using semiconductor electronic power switches wherein values for losses of one or more of the electronic power switches are processed by means of the temperature model characterised by at least one temperature sensor having an output coupled with the calculator (8), each temperature sensor being allocated to a subgroup of at least two of said electronic power switches, each temperature sensor (Thu, Thv, Thw) being centrally positioned in the middle between the electronic power switches of the subgroup to which the temperature sensor is allocated and connected in a heat transmitting way with the cooling body (1), wherein the number of allocated temperature sensors does not exceed half the number of electronic power switches in the group.

9. A power electronic temperature sensing switch arrangement according to claim 8, characterised in that each temperature sensor (Thu, Thv, Thw) is fitted directly to the cooling body (1).

10. A power electronic temperature sensing switch arrangement according to claim 9, characterised in that the temperature sensors (Thu, Thv, Thw) are arranged along a central symmetrical line of the cooling body (1).

11. A power electronic temperature sensing switch arrangement according to claim 9, characterised in that the temperature sensors (Thu, Thv, Thw) are evenly distributed across the surface of the cooling body (1).

12. A power electronic temperature sensing switch arrangement according to claim 9 wherein more than two electronic power switches (S1-S6) are positioned on the cooling body (1), the electronic power switches being interconnected and controlled for generating a two-, three- or multi-phase alternating current system (U, V, W), characterised in that one temperature sensor (Thu, Thv, Thw) is positioned centrally between two electronic power switches (S1-S6) per alternating current phase (U, V, W).

13. A power electronic temperature sensing switch arrangement according to claim 12, characterised in that at least six electronic power switches (S1-S6) are positioned and can be controlled on the cooling body (1) for generating a three-phase current system (U, V, W), for which a different pair of the electronic power switches (S1, S4; S2, S5; S3, S6) serves for generating each phase of a three-phase current (U, V, W), characterised in that for each three-phase current (U. V, W) a temperature sensor (Thu, Thv, Thw) is positioned centrally between each said pair of electronic power switches (S1, S4; S2, S5; S3, S6).

* * * * *